United States Patent [19]

Hagedorn et al.

[11] 4,217,126
[45] Aug. 12, 1980

[54] METHOD OF AND APPARATUS FOR PRESS BENDING GLASS SHEETS

[75] Inventors: Floyd T. Hagedorn, Oregon; Donald D. Rahrig; Robert G. Revells, both of Toledo; James A. Bushong, Swanton, all of Ohio

[73] Assignee: Libbey-Owens-Ford Company, Toledo, Ohio

[21] Appl. No.: 1,174

[22] Filed: Jan. 5, 1979

[51] Int. Cl.² .............................................. C03B 23/02
[52] U.S. Cl. ...................................... 65/106; 65/273; 65/287; 65/291
[58] Field of Search ................. 65/106, 273, 286, 287, 65/291

[56] References Cited

U.S. PATENT DOCUMENTS

| | | | |
|---|---|---|---|
| 2,536,905 | 1/1951 | Bird et al. | 65/273 |
| 2,677,918 | 5/1954 | Bird et al. | 65/273 |
| 3,123,459 | 3/1964 | Hens | 65/106 |
| 3,230,066 | 1/1966 | Carson et al. | 65/287 |
| 3,329,494 | 7/1967 | Carson et al. | 65/287 |
| 3,484,225 | 12/1969 | Bognar | 65/106 X |
| 3,507,639 | 4/1970 | Seymour | 65/106 X |
| 3,523,783 | 8/1970 | Clark et al. | 65/287 |
| 3,615,338 | 10/1971 | Boyles | 65/291 |
| 3,846,105 | 11/1974 | Petrella et al. | 65/106 |

Primary Examiner—Arthur D. Kellogg
Attorney, Agent, or Firm—Collins, Oberlin & Darr

[57] ABSTRACT

A method of and apparatus for press bending glass sheets to special configurations including a press member of outline or ring-type construction having at least one shaping pad mounted for limited floating movement within the outline of the shaping ring for imparting a specially configurated curvature to the glass sheet. The shaping pad is provided with a cover of suitable material maintained in a wrinkle-free condition along both the length and width of the pad. Means are provided for adjusting the vertical disposition of portions of the pad.

23 Claims, 12 Drawing Figures

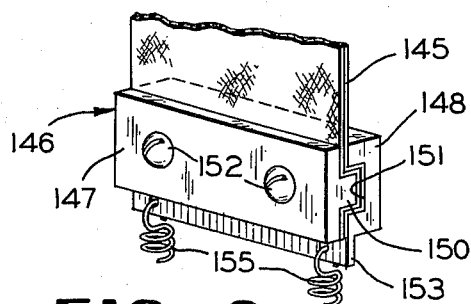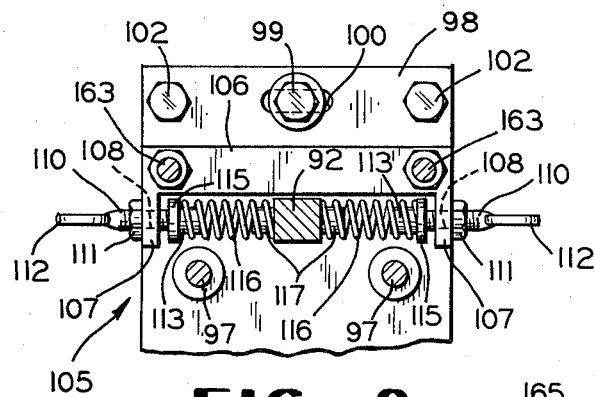

METHOD OF AND APPARATUS FOR PRESS BENDING GLASS SHEETS

BACKGROUND OF THE INVENTION

The present invention relates generally to the production of bent glass sheets and, more particularly, to an improved method of and apparatus for bending specially configurated glass sheets.

Bent sheets of glass are commonly used as glazing closures in vehicles such as automobiles and the like. For such applications, the glass sheets must be bent to precisely defined curvatures dictated by the configuration and size of the vehicle openings and the overall styling of the vehicle. At the same time, it is important that the bent sheets meet stringent optical requirements and that the viewing area of the window or closure be free of optical defects that would tend to interfere with the clear viewing therethrough. Further, bent glass sheets intended for use as glazing closures in vehicles are subjected to an additional heat treatment to temper the glass for strengthening the same and increasing the resistance thereof to damage resulting from impact.

Generally, the commercial production of bent, tempered sheets of glass for automotive glazing closures includes heating pretrimmed flat sheets of glass to the softening temperatures thereof, bending the heated sheets to a desired curvature between a pair of complementary shaped press members and then chilling the bent sheets in a controlled manner to a temperature below the annealing range of glass.

Very often, the press members are of outline or ring-type construction comprised of shaping rails conforming in outline to the glass sheets to be bent and are provided with opposed complementary shaping surfaces to impart the desired curvature to the sheets. These shaping rails engage only the marginal edge portions of the sheets to be bent, the remainder or central portions of the glass sheets located inwardly of the marginal edge portions being unrestrained and allowed to sag.

While such outline type press members have admirably served the purposes for which they were designed in bending glass sheets of conventional shapes, they have limitations in forming unusual or specially configurated glass shapes, such as glazing closures having longitudinal reverse bends in the direction opposite to sagging for example.

SUMMARY OF THE INVENTION

Accordingly, it is a primary object of the present invention to provide a method of and apparatus incorporating structure for imparting irregular shapes to heated glass sheets.

It is another object of this invention to provide the conventional outline-type press ring with shaping pads located interiorly of the ring to effect a reverse bend in a heated glass sheet.

It is still another object of the present invention to provide the foregoing shaping pads with a cover arrangement including means for maintaining the cover in an unwrinkled condition to preclude marring and distortion of the glass sheet surfaces.

It is a further object of this invention to provide the aforementioned shaping pads with a resilient mounting arrangement to accommodate slight glass movements and to compensate for slight variations in alignment with the opposed press member.

It is still a further object of the present invention to provide the above-mentioned pads with means selectively adjusting the dispositions of portions thereof to alter the curvature of the pad shaping surfaces.

The foregoing and other objects, advantages, and characterizing features of the present invention will become clearly apparent from the ensuing detailed description thereof considered in conjunction with the accompanying drawings wherein like reference numerals denote like parts throughout the various views.

BRIEF DESCRIPTION OF THE DRAWINGS

FIG. 6 is a perspective view of a cloth clamping arrangement used in conjunction with this invention;

FIG. 7 is a vertical sectional view, taken along line 7—7 of FIG. 5;

FIG. 8 is a fragmentary, horizontal sectional view, taken along line 8—8 of FIG. 7;

FIG. 9 is an exploded, perspective view of a guide assemby used in conjunction with this invention;

FIG. 10 is a fragmentary vertical sectional view, taken along the line 10—10 of FIG. 5;

FIG. 11 is a vertical sectional view, taken along the line 11—11 of FIG. 5; and

FIG. 12 is a fragmentary, end elevational view, partly in section, of another form of means for adjusting the vertical disposition of portions of the shaping pad.

DESCRIPTION OF THE PREFERRED EMBODIMENT

Figure 1:
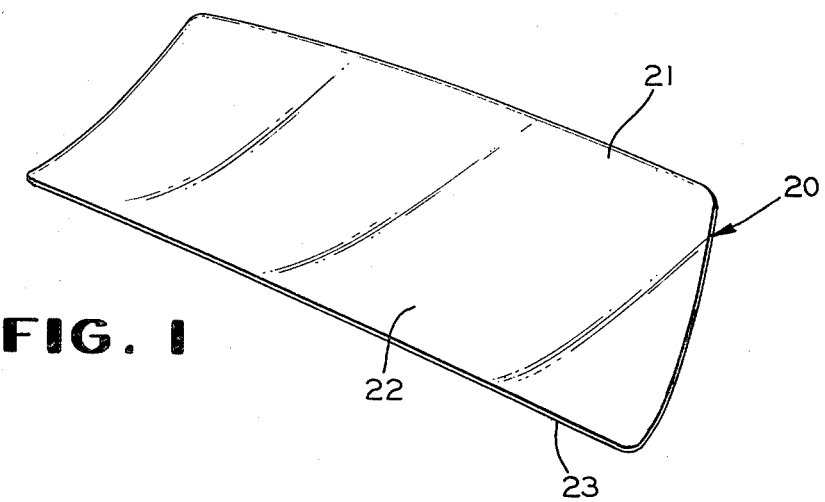
FIG. 1 is a perspective view of a reversely bent glazing closure produced in accordance with the method and apparatus of this invention.

Referring now in detail to the drawings, there is shown in FIG. 1 a glazing closure 20 bent to the desired configuration in accordance with the method and apparatus of this invention and which is utilized as a backlight in an automobile embodying recent styling features. The backlight 20 is comprised of a single glass sheet having a generally slight convex curvature about a central transverse axis and a slight convexly curved upper portion 21 in the crosswise direction which merges or blends into a reversely bent, concavely curved lower portion 22. The lower concave portion 22 has a more sharply pronounced curvature than the upper convex portion 21 nd will sometimes hereinafter be referred to in the description as a "J-bend". This lower concave portion 22 terminates in a longitudinal edge 23 located adjacent the sheet metal panel forming a part of the deck lid of the vehicle when installed and forms therewith a continuation to create the appearance of unity between the glass and the sheet metal. While it will be convenient to describe the method and apparatus of this invention in connection with the formation of a single glass sheet having a reversely bent, crosswise curvature, it should be understood that the principles of this invention are equally applicable in the production of glass sheets having reversely bent curvatures in any direction and/or multiple layered sheets of glass, such as conventional laminated windshields, for example.

Figure 2:
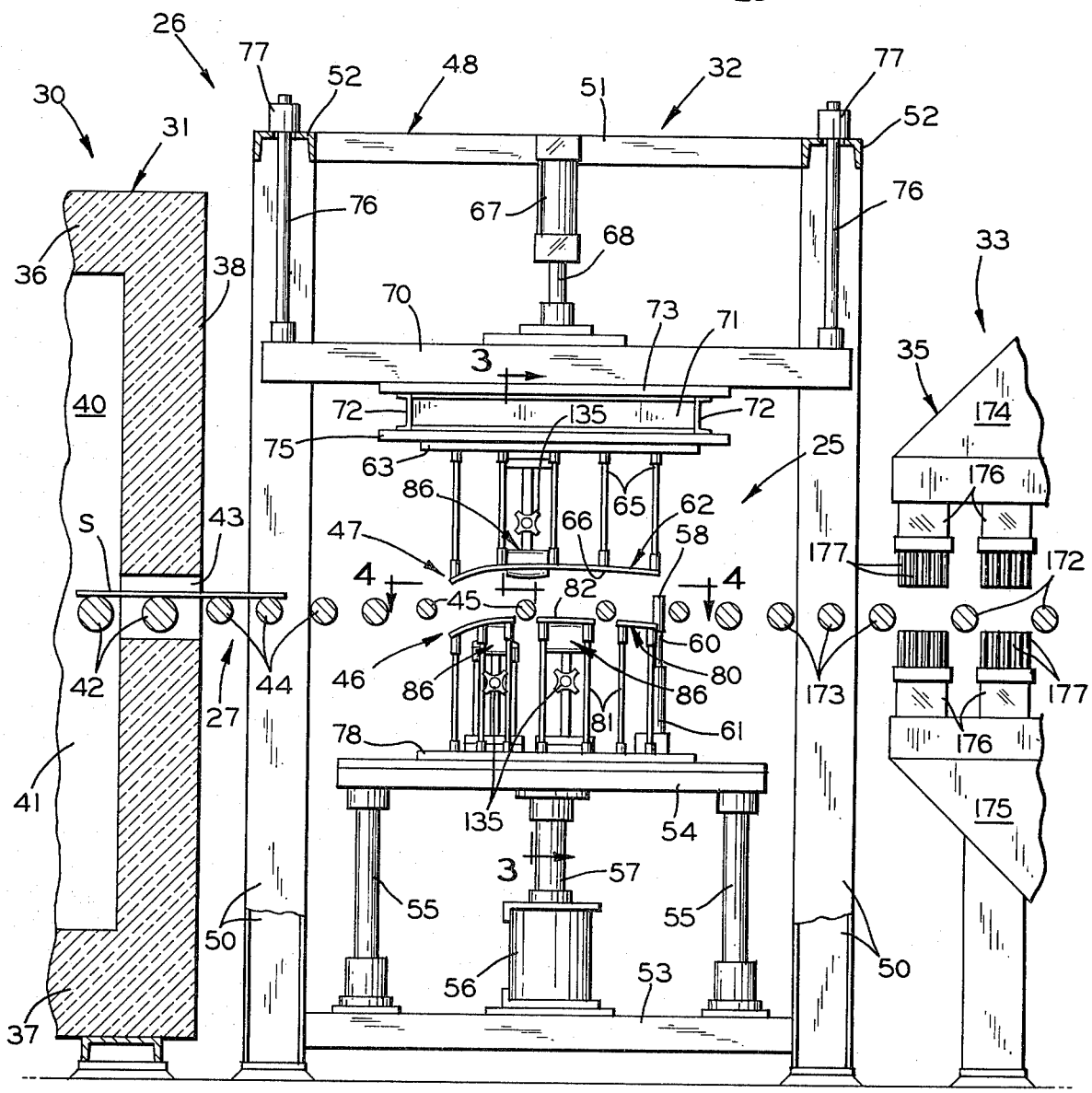
FIG. 2 is a side elevational view of a bending apparatus interposed between a glass heating and glass tempering station and embodying the improved press member of this invention.

Referring now in detail to the illustrative embodiment for carrying out this invention and forming the "J-bend" in the finished product, there is shown in FIG. 2 an improved bending apparatus, generally designated 25, constructed in accordance with this invention and hereinafter more fully described, embodied in a horizontal glass sheet bending and tempering apparatus, comprehensively designated 26. Apparatus 26 includes a continuous conveyor system 27 adapted to support a plurality of sheets S for movement in a generally horizontal path through a heating station 30 having a furnace 31 for heating the sheets to their softening point or bending temperatures, a bending station 32 embodying the novel apparatus 25 of this invention for bending the heated sheets S to the desired shape, and a tempering station 33 having chilling means 35 for rapidly reducing the temperature of the bent sheets to produce the desired temper therein. While preferably the invention will be described in connection with the horizontal bending and tempering apparatus depicted in the drawings, it should be understood that the press bending apparatus 25 of this invention is not restricted to such a horizontal operation, but has utility in a vertical press bending operation or any environment utilizing either a single mold or opposed press members for shaping glass.

In the illustrative embodiment, the glass sheets S are heated in the furnace 31, which is of the tunnel-type having a top wall 36, a bottom wall 37, a rear end wall 38, and opposite side walls 40, all formed of a suitable refractory material and defining a heating chamber 41. The heating chamber 41 can be heated in any desired manner by suitable heating means, such as gas burners or electrical resistance elements for example (not shown), located in the top and side walls of furnace 31. Such heating means are suitably controlled by apparatus (also not shown) to obtain the desired temperature in various zones within the heating chamber 41. The sheets S are carried through the heating chamber 41 of the furnace on a plurality of conveyor rolls 42, forming a part of the conveyor system 27, and extending transversely across the chamber 41 with their opposite ends projecting through the opposite walls 40 and suitably journalled in bearing blocks (not shown) located exteriorly of and along the side walls of furnace 31.

A plurality of glass sheets S are individually loaded on and supported in a generally horizontal plane on the longitudinally spaced conveyor rolls 42 at the entrance end of the furnace (not shown) and heated in a controlled manner to the desired bending temperature during their passage therethrough. Upon emerging through an opening 43 in the rear end wall 38 of furnace 31, the heated glass sheets S are transferred from conveyor rolls 42 onto a second series of spaced conveyor rolls 44, and then upon a third series of conveyor rolls 45, both of which also form a part of the conveying system 27 and which are journalled at their opposite ends in suitable bearing blocks (not shown) located along and on opposite sides of the bending station 32. As shown in FIG. 2, the rolls 45 are smaller in diameter than either of the rolls 42 or 44 to define a larger space therebetween for a purpose hereinafter more fully described. The series of rolls 45 support the glass sheets S horizontally for movement into and within the bending station 32, before and after bending, and then convey them to the tempering station 33. While not restricted thereto, preferably the conveyor rolls 45 are of the contoured, pivotal type, such as those disclosed and claimed in U.S. Pat. No. 3,905,794, granted Sept. 16, 1975, and assigned to the same assignee as the present invention.

In accordance with this invention, the bending apparatus 25 consists essentially of a movable lower press member 46 and an upper press member 47, both suitably mounted within a rigid framework 48, which includes two substantially vertical columns 50 located on each side of the conveyor system and spaced longitudinally therealong with the columns of the opposite sides of the conveyor being laterally aligned. The columns 50 extend upwardly above the upper press member 47 and are tied together at their upper and lower ends by horizontal beams 51 and 52 extending lontiduinally and transversely of the conveyor, respectively, and secured at their opposite ends to the aligned columns 50 to form a rigid box-like structure. A base member 53 extends between the upright columns 50 for supporting the lower press member 46 and associated parts. The upper press member 47 is mounted above conveyor rolls 45 while the lower press member 46 is located below the conveyor rolls 45 and mounted on a carriage 54 for vertical reciprocal movement toward and away from the press member 47.

The carriage 54 is supported by a pair of guide members 55 (FIG. 2) and vertically movable by a fluid actuator 56 mounted on base member 53 and having a suitable piston rod 57 for raising and lowering the press member 46 between a lower position beneath conveyor rolls 45 and an upper position thereabove for lifting a heat-softened glass sheet S from the conveyor rolls 45 and pressing the same against the upper press member 47 into the desired shape. After bending, piston rod 57 is retracted to lower the press member 46 below conveyor rolls 45, depositing the bent sheet thereon for advancement into the tempering station 33.

A pair of laterally spaced locator stops 58 are positioned in the path of movement of the advancing glass sheets to interrupt movement thereof and accurately position the same in the desired location relative to the lower press member 46. Each stop 58 is secured to the distal end of a piston rod 60 of a fluid actuating cylinder 61 mounted on the carriage 54. The cylinders 61 are operative to raise and lower the stops 58 between an upper position above conveyor rolls 45 in the path of movement of the glass sheets S and a lower position therebeneath.

The upper press member 47 is of outline or ring-type construction and comprises a continuous shaping rail 62 connected to a base member 63 by a plurality of connecting rods 65. The shaping rail 62 conforms in outline to the glass sheets to be bent and is provided with a downwardly directed, shaping surface 66 on the lower surface thereof to impart the desired curvature to the sheet. Of course, the particular outline of the shaping rail 62, as well as the specific curvature of the shaping surface 66, is dictated by the desired finished shape of the glass sheet being bent and can vary, as desired.

The means for supporting the upper press member 47 on frame 48 includes at least one actuating cylinder 67 (FIG. 2) mounted on one of the upper horizontal beams 51 and having a suitable reciprocal piston (not shown) provided with a piston rod 68 connected at its outer end to a vertically reciprocal platen frame 70. The base member 63 of the press member 47 is connected to the platen frame 70 for movement therewith by means of supporting structure including interconnected structural members 71 and 72 sandwiched between support plates 73 and 75. A plurality of guide posts 76 are connected at their lower ends to the four corners of platen frame 70, respectively, and extend upwardly through suitable bushings 77 mounted on upper horizontal beams 52 for sliding movement relative thereto to properly guide platen frame 70 during its vertical reciprocal movement.

The lower press member 46 also is of outline or ring-type construction and comprises a base member 78 secured to the carriage 54 and a shaping rail 80 connected to the base member 78 in spaced relation thereto by means of a series of connecting rods 81. The shaping rail 80 conforms in outline to the glass sheets S to be bent and is provided on its upper face with an upwardly directed shaping surface 82 complementary to the upper press member shaping surface 66 in opposed relation thereto. To permit displacement of the lower shaping rail 80 above the level of the conveyor rolls 45 for lifting the sheets thereabove into pressing engagement with the upper shaping rail 62, the lower shaping rail 80 is formed of a plurality of segments (FIG. 4) including end bars 83 extending generally in the direction of rolls 45 and side bars 85 extending generally transversely to the conveyor rolls 45 and spaced apart from each other a sufficient distance to pass between adjacent rolls 45. As compared to rolls 42 and 44, the diameter of rolls 45 are formed relatively small to provide maximum clearance therebetween for the passage of the lower press member segments.

While the outline or ring-type press members so far described function admirably in forming glass sheets into desired simple or compound curvatures whereby the sheet projects or bows outwardly in only one direction, it is impossibe to impart a reversely bent bow or curvature to the heat-softened sheet. The reason for this is that the glass sheet is supported only along its marginal edge whereby the central portion of the sheet located inwardly of the press contacting marginal edge thereof sags by gravity below the plane of the shaping rail. The extent of sagging can be determined and the consequent desired curvature of the heat-softened sheet in the downward direction can be accurately controlled by the contour of the shaping rail surfaces and by controlling the temperatures to which the glass sheet is heated. However, there is no way to impart a reversely bent curvature to this heat-softened glass central portion so that a portion or section thereof is bent or bowed in an opposite, upward direction.

The present invention addresses itself to this problem by incorporating shaping elements or pads, generally designated 86, within the confines of the shaping rails of press members 46 and 47 to engage and impart such reversely bent curvatures to the glass sheet without marring or otherwise distorting the heat-softened glass surfaces. In the illustrated embodiment of the invention, the lower press member 46 is provided with two shaping pads 86 while the upper press member has only one. However, any number of such pads 86 can be utilized in the press members, as desired, within the purview of this invention. Since the construction of the shaping pads 86 ae identical in structure and function in the same manner, it is believed that a detailed description of only one, preferably one of the pads 86 mounted on the lower press member 46, will suffice, the same reference characters being applied to identical elements.

Figure 3:
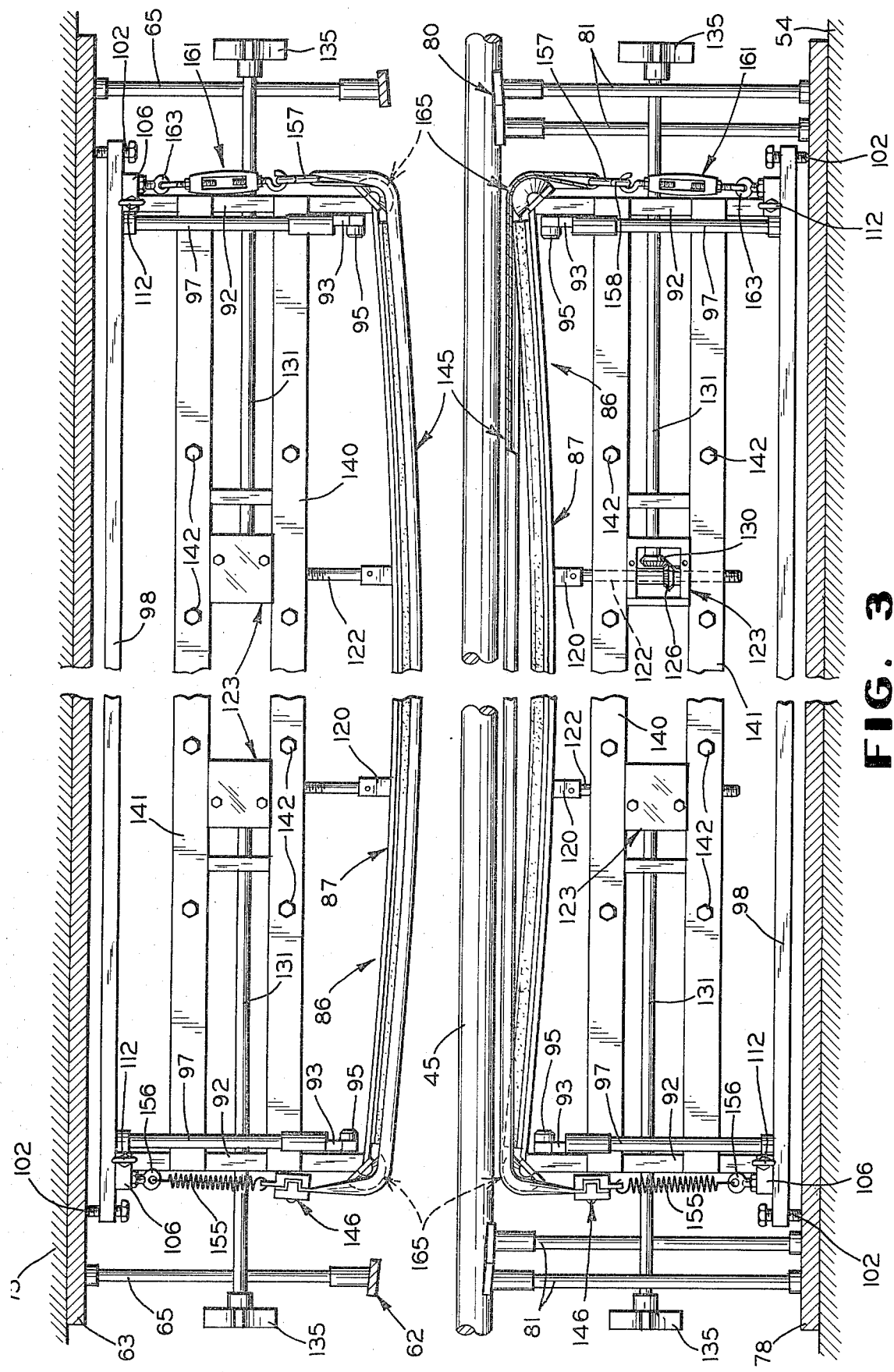
FIG. 3 is a vertical sectional view, on an enlarged scale, taken along the line 3—3 of FIG. 2 and showing the press members constructed in accordance with this invention.
Figure 4:
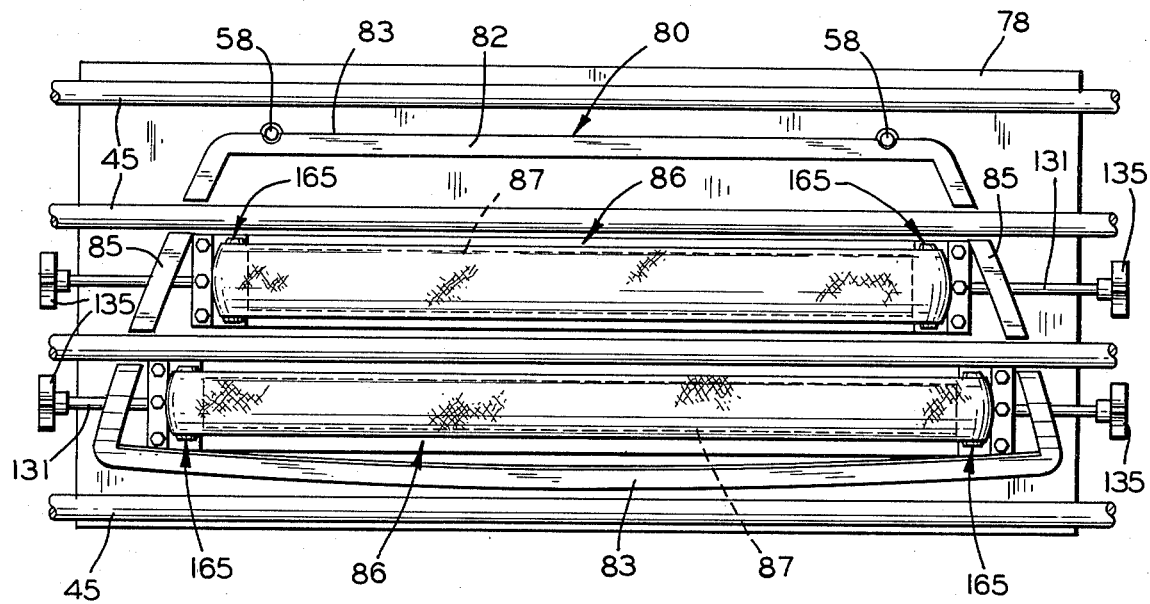
FIG. 4 is a partial top plan view looking in the direction of arrows 4—4 of FIG. 2, showing the shaping pads of the lower press member in relation to the conveyor rolls.
Figure 5:
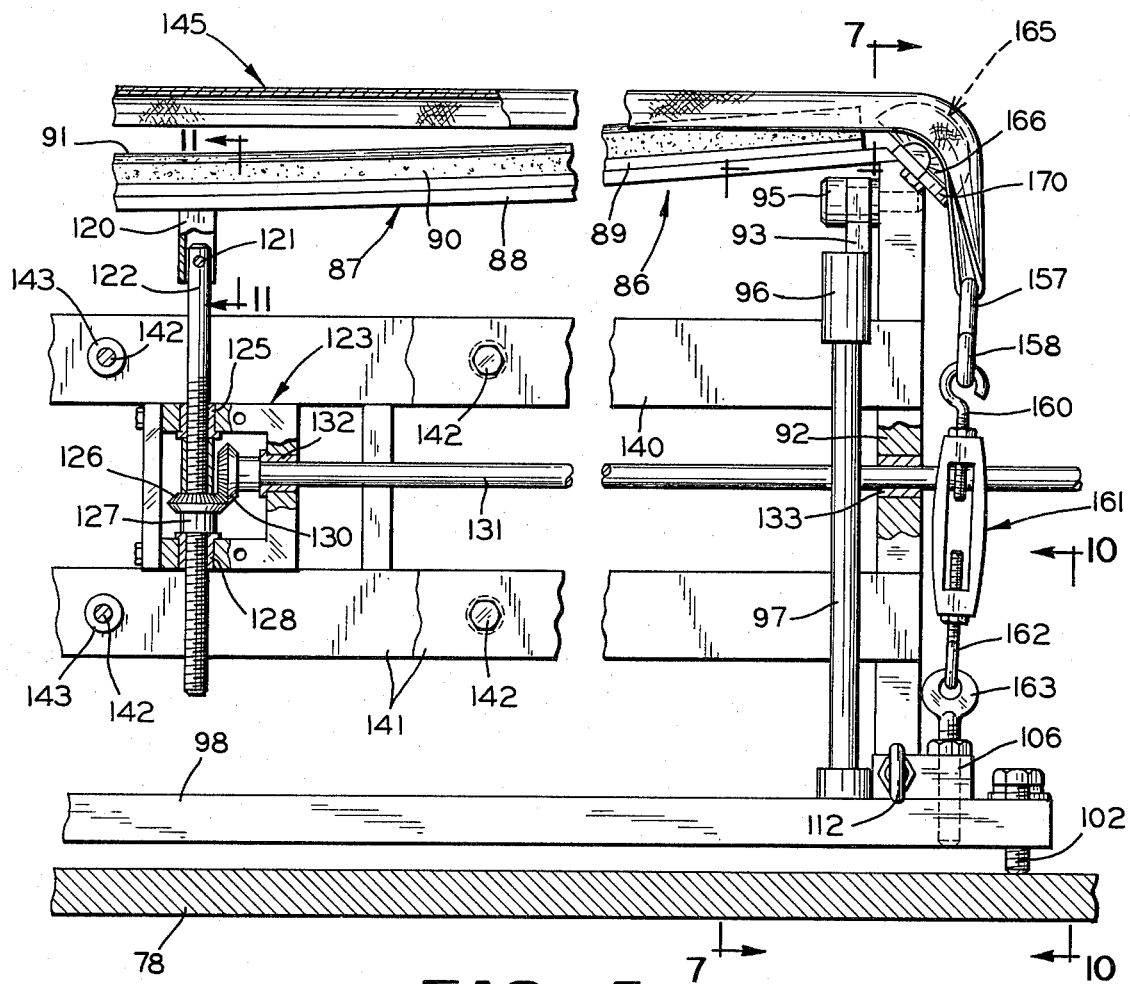
FIG. 5 is a fragmentary, enlarged end elevational view, partly in section, of a shaping pad, showing one form of means for adjusting the vertical disposition of portions of the shaping pad and the means for tensioning the pad cover.

As best shown in FIGS. 3–5, each shaping pad 86 comprises an elongated, generally concavely curved body 87 extending lengthwise of the press member 46 within the shaping rail 80 and having a lateral dimension smaller than the spacing between adjacent conveyor rolls 45 to permit passage therebetween upon vertical movement of the lower press member 46. As best shown in FIG. 11, the body 87 is of composite construction including a metallic base 88, an intermediate layer 89 of silicone and an outer layer 90 of silicone sponge rubber. The outer face of layer 90 is provided with a shaping surface 91 which has a generally concave curvature in its longitudinal dimension (FIGS. 3 and 5) along with body 87 but a generally convex configuration in its lateral dimension (FIG. 11), to impart the desired curvature to a portion of the sheet.

The shaping pad 86 is supported adjacent each opposite end on an upright post 92 welded or otherwise fixedly secured to the underside of base 88 and pivotally connected to a generally triangularly-shaped plate 93 (FIG. 7) by means of a shoulder screw 95. The plate 93 in turn is rigidly attached at its lower end, as by welding, to the enlarged heads 96 of a pair of laterally spaced, vertically extending support rods 97, which are affixed at their lower ends to a base plate 98. The base plate 98 is adjusatably secured at each of its opposite ends to the press base member 78 by means of a screw 99 extending through a slotted opening 100 formed in the base plate 98 and threaded into a tapped opening 101 formed in base member 78. Also, a pair of screws 102 on either side of screw 99 extend through tapped openings 103 formed in the base plate 98 and bear against base member 78. These screws 102, together with screw 99, provide for vertical adjustment of the plate 98 in either a true horizontal or longitudinally inclined attitude relative to base member 78, as desired, as well as slight lateral tilting adjustment of the plate 98 about the longitudinal axis thereof relative to base member 78. Additionally, the slot 100 and screw 99 arrangement provides for bodily lateral adjustment of plate 98 relative to base member 78. These various adjustments offer substantial latitude in positioning and orienting each of the shaping pads 86 on its respective press member in proper relationship to an adjacent or opposed shaping pad 86.

Upon engagement of the shaping pads 86 with a heat-softened glass sheet when lifting the same off the conveyor rolls for pressing, there is a tendency for the sheet to move slightly relative to the shaping surface of a fixed pad, thereby posing problems of marring and possible distortion of the glass contacting surface. These problems are obviated in the present invention by providing a pivotal mounting arrangement for each shaping pad 86, permitting some lateral play or movement thereof to move slightly along with the portion of the sheet contacting the pad shaping surface and to take up minor variations in alignment or relative positioning thereof with the shaping pads and/or shaping rail of the opposed press member.

As earlier mentioned, the posts 92 are pivotally mounted adjacent their upper ends to the plates 93, the latter forming a part of a fixed frame structure including the support rods 97 and base plate 98. The lower ends of the posts 92 are freely suspended and not anchored or tied down to any other structure. Thus, the posts 92 along with shaping pad 86 are free to move or oscillate laterally about a horizontal axis defined by the coaxially aligned shoulder screws 95. In order to retard and control the intensity and extent of such lateral movement means, generally designated 105, are provided for applying tension to the lower ends of the posts 92. As best shown in FIGS. 7 and 8, such means 105 includes a block 106 rigidly secured to base plate 98 and having horizontally projecting legs 107 formed with coaxially aligned openings 108 for receiving adjusting screws 110. Each of the screws 110 is threaded through a nut 111 affixed to the outer surface of the associated leg 107 and is provided with a flat head 112 for easy manual turning. The inner or distal end of each screw 110 is formed with a spring guide 113 and a flange 115 for accommodating one end of a tension spring 116, the other end bearing against the post 92 and properly located about a stud 117 attached to one side of the post 92. Thus, turning of the screws 110, either singularly or in combination, serves to compress or relax the associated springs 116, as desired, to apply the proper tension to the lower ends of posts 92 and thereby control the extent of lateral movement of the associated shaping pad. The pivotal mounting of the upper ends of the posts 92, together with the limited free lateral movement of the lower end by the above-described tensioning arrangement, allows each shaping pad 86 to "float" as required and renders the same self centering or self aligning.

Means are provided at spaced intervals along the body 87 of shaping pad 86 for vertically adjusting portions of the pad 86 to impart the precise curvature desired in the finished glass sheet. Such means include at each adjustable region a sleeve 120 affixed to the underside of the metallic base 88 of pad 86 for receiving and securing therein, as by means of a pin 121, the upper end of a vertically extending, externally threaded actuating rod 122 which projects downwardly through a gear housing 123. As best shown in FIG. 5, the rod 122 extends through a bushing 125 affixed to the upper wall of housing 123 and then through a beveled gear 126 mounted within housing 123 for rotary movement but fixed against axial movement. The gear 126 is formed with a shank 127 having an internal thread for threaded engagement with rod 122. The rod 122 projects outwardly through a bushing 128 affixed to the lower wall of housing 123. The gear 126 meshes with a right angularly related beveled gear 130 affixed to the inner end of a control shaft 131 extending through a first bushing 132 affixed to a side wall of gear housing 123 and a second, axially spaced bushing 133 mounted in the post 92. The distal end of shaft 131 is provided with a knob 135 to facilitate manual turning of the shaft 131. Thus, the portion or region of shaping pad 86 above the rod 122 can be raised or lowered, as desired, via the gearing arrangement in housing 123 and control shaft 131 by manipulating knob 135.

As shown in FIG. 3, a similar arrangement, which is a mirror image of the structure described above, and including a hand controlled knob 135 located on the opposite side of the press, is utilized to vertically adjust another portion of the shaping pad 86. The elements are identical to that first described and are identified by the same reference characters. Locating the knobs 135 outwardly of the press area permits quick and easy pad adjustment without entry into the maze of components within the press area and without interference or stoppage of the glass bending and tempering operation. While only two portions or regions of each shaping pad 86 are shown as being vertically adjustable in the illustrative embodiment depicted, it should be appreciated that the shaping pad 86 can be vertically adjusted at any number of regions along its length, as desired, within the purview of this invention. Such an arrangement is illustrated in FIG. 12 wherein a plurality of longitudinally aligned actuating rods 122 are employed to vary the vertical dispositions of a plurality of portions of the shaping pad 86.

Referring now to FIG. 12, another form of a control arrangement is depicted for preferably locating the knobs 135 or other manually manipulative controls on one side only of the press area, which is often desirable where the other side of the press is encumbered by the drive and/or other mechanical impedimenta. To this end, all but one of the control shafts, identified in this form as 131', are provided with a flexible coupling or torque transmitting universal joint 136 interposed between the gear 130 and the distal end of the shaft 131'. Such an arrangement contemplates the use of any number of actuating rods 122. In addition to the flexible coupling 136, the distal ends of the respective shafts 131' are provided with sockets 137 rather than knobs to conserve space and minimize obstructions on such side of the press area. Of course, suitable hand operable tools having flat-sided heads complementary to the flat sided openings 138 in sockets 142 are employed to turn the respective shafts 131' for vertically displacing the actuating rods 122.

A pair of laterally spaced upper bars 140 and a pair of laterally spaced lower bars 141, (FIGS. 3 and 7) extending lengthwise and beneath the shaping pad 86, are mounted at their respective opposite ends on posts 92. Each pair is connected together at longitudinally spaced intervals by bolts 142 maintained in laterally spaced relation by spacer sleeves 143 disposed therebetween about the bolts 142. These bars 140 and 141 serve as a frame for supporting the gear housings 123.

The shaping surfaces 91 of pads 86 are provided with a cover 145 formed of a suitable, non-abrasive, heat resistant material, such as fiber glass cloth for example, to provide a smooth surface to the heat-softened glass sheet and a somewhat resiliently yieldable cushion between the glass sheet and the shaping surface to preclude marring of the former upon contact therewith. It should be noted that the use of such covers is a well known expedient in the glass pressing art and generally pose no particular problems when adhesively or otherwise fixedly secured to the shaping surface of a conventional press ring because of the relatively narrow width of such rings. However, efforts to similarly apply such material to the substantially wider surfaces of the shaping pads 86 incorporated in the press member of the present invention present problems of wrinkling because of the curvature of the shaping surface in both the longitudinal and lateral dimensions. A significant feature of this invention resides in the means for maintaining the cover 145 in an unwrinkled condition along both the length and width of the pad shaping surfaces, whether of concave or convex configuration.

The cover 145 is in the form of an open ended tube or sleeve flattened to form a double layered strip covering the full length and width of the pad shaping surface 91.

The cover 145 is adapted to project over the ends and sides of the pad 86 and normally is disposed in a taut condition above the pad body 87 in spaced relation thereto.

The means for mounting the cover 145 includes a clamp assembly 146 comprised of a pair of blocks 147 and 148 having a projection 150 and indentation 151, respectively, for clamping one end of the cover 145 therebetween. These blocks 147 and 148 are secured together by suitable fasteners 152. The clamp assembly 146 is formed with a depending flange 153 having spaced openings therein for receiving the hooked ends of helical springs 155, the other ends of said springs being suitably anchored, as by eye bolts 156, to tension block 106.

The other end of cover 145 is looped about an inverted U-shaped hook member 157 provided with eyelets 158 at the opposite ends thereof for receiving the ends of hook bolts 160 mounted on the upper ends of turnbuckles 161. The other or lower ends of the turnbuckles 161 also are provided with hook bolts 162 having ends inserted through the eyelets of eye bolts 163 threaded into tension block 106. The turnbuckles 161 can be turned in the appropriate direction to induce the proper tension in cover 145 and thereby maintain the same taut and in an unwrinkled condition, particularly in the longitudinal direction, when pressed against the glass surface by the underlying shaping pad 86.

In order to maintain the cover 145 in an unwrinkled condition in a transverse direction crosswise thereof, a pair of longitudinally spaced guide means 165 are provided at the opposite ends of the shaping pad 86. As best shown in FIG. 9, each guide means 165 consists of a fixed roll segment 166 having an outer convex surface 167 and fixedly secured along its planar face 168 to the outer flat face of a mounting plate 170 by screws 171 extending through elongated slots 172 formed in mounting plate 170 and threaded into tapped openings formed in the planar face 168 of roll segment 166. These elongated slots 171 allow for limited mounting adjustment of the segment 166 relative to its mounting plate 170, the latter being welded or otherwise fixedly secured at an inclined attitude to the beveled end of the pad base 88 and the upper chamfered end of post 92. The convex surfaces 167 of segments 166 impart a similarly shaped configuration to the cover 145 in a transverse direction, assisting in maintaining the latter in a wrinkle-free condition upon contact with the glass surface, thus avoiding marring of such surface.

The mode of operation of the apparatus of this invention in bending one sheet of glass is as follows:

A flat glass sheet S is loaded onto the conveyor rolls 42 at the entrance end (not shown) of the furnace 31 for movement through the heating chamber 41 wherein the sheet is heated throughout to substantially its softening point or bending temperature. This heated sheet passes through the furnace opening 43 and is transferred onto conveyor rolls 44 and then conveyor rolls 45 for movement into the bending station 32 between the press members 46 and 47.

As the sheet S enters the bending station 32, a photoelectric cell or other suitable detection device (not shown) activates a timer controlling the speed of conveyor rolls 45 and the actions of the lower press actuating cylinder 56 and the locator stop cylinders 61. The sheet is accurately located relative to the press members 46 and 47 when the leading edge thereof engages the stops 58. The timing mechanisms are so designed that the cylinder 56 is actuated to raise the lower press member 46 upwardly just about the time the leading edge of the sheet engages locator stops 58.

As the lower press member 46 moves upwardly to lift the sheet off conveyor rolls 45, the shaping pads 86, which are disposed at an elevation slightly higher than shaping rail 80, will engage the underside of the glass sheet just prior to the engagement of the shaping rail 80 therewith. Initial engagement of the pads 86 with the sheet S causes the latter to shift slightly. However, because of the pivotal mounting of the pads 86 on the press member 46, the pads 86 also will move slightly laterally along with the glass and thereby avoid scuffing and marring of the heat-softened glass surfaces that otherwise might occur if the pads were fixedly mounted against such movement. As soon as the pads 86 have accommodated such glass movement, and the sheet has fully settled on the shaping rail 80, the pads 86 will return to their normal positions by virtue of the spring tension acting on the lower ends of the pad support posts 92.

During the upstroke of the lower press member 46, cylinders 61 are actuated to retract locator stops 58 below conveyor rolls 45 to permit advancement of the sheet when subsequently returned to the conveyor rolls 45 after bending. As the glass sheet is raised upwardly into contact with the shaping pad 86 and shaping rail 62 of upper press member 47, the opposed shaping pads 86 of both press members will tend to move slightly laterally, as required, to bring them into the proper but offset relation for imparting the desired reversely bent, longitudinal curvature to the sheet inwardly of the marginal edge thereof. After the glass sheet S is formed into its final configuration by the coaction of the shaping pads 86 and shaping rails 62 and 80, the lower press member 46 is lowered below the conveyor rolls 45 to deposit the bent sheet thereon. The rolls 45 receive the bent sheet and advance the same out of the bending station 32 and onto a fourth series of conveyor rolls 173, also a part of the conveyor system 27, and which continue to advance the bent sheet along the path of movement into and through the tempering station 33.

The chilling means 35 in tempering station 33 comprises upper and lower blastheads 174 and 175 disposed above and below the path of movement of the glass sheets and connected to a source (not shown) of cooling fluid, such as air for example. The blastheads 174 and 175 are provided with a plurality of transversely extending sections 176, each of which is provided with a plurality of tubes 177 for discharging streams of cooling air against the opposite surfaces of the bent sheets moving along the path on conveyor rolls 173. The bent sheets are advanced between the blastheads at a speed promoting the proper rate of cooling to obtain a quality temper in the sheets.

Actuation of cylinders 56 and 61 is effected by a conventional fluid control valve (not shown). Proper sequencing of the operation of these control valves, as well as the variation of speeds imparted to the several series of conveyor rolls 42, 44, 45 and 173 for effecting the foregoing operations in a cyclic, timed relationship is effected by conventional limit switches and/or by conventional timers incorporated in the electrical control system. Each of these switches and/or timers trigger subsequent stages of operation of the various actuators and conveyor roll drives and since such sequentially operable switches and timing arrangements are known and, per se, form no part of the present invention, no detailed description or further amplification thereof is believed necessary.

From the foregoing, it is apparent that the objects of the invention have been fully accomplished. An improved method and apparatus is provided for bending glass sheets in a manner imparting reversely bent curvatures thereto in a press bending operation, which has heretofore been unattainable. Stating this another way, as a result of this invention, portions of the glass sheet shaped between press rings are curved or bowed in a direction opposite to the usual gravity-sagged direction. This is made possible by the provision of "floating" shaping pads mounted on the press members within the confines of the press ring shaping rails. Each of the shaping pads is provided with a cover of non-abrasive, heat resistant material and is provided with means for maintaining the cover in an unwrinkled condition across the length and width of the shaping surface of the pads. Also, means are provided for adjusting the vertical disposition of any selected number of portions of the pad along the length thereof.

It is to be understood that the form of the invention herewith shown and described is to be taken as an illustrative embodiment of the same, and that various changes in the shape, size and arrangement of parts, as well as various procedural changes, may be resorted to without departing from the spirit of the invention.

We claim:

1. A method of bending a glass sheet comprising: heating a glass sheet to the softening point thereof, supporting said heated sheet in spaced relation to a press member having a first shaping surface corresponding to the marginal outline of said heated sheet and at least one second shaping surface located within the outline of said first shaping surface and floatingly mounted on said press member for free lateral movement relative to said first shaping surface, moving said shaping surfaces simultaneously to engage the marginal edge and an interior portion, respectively, of said sheet to move said sheet toward and against an opposed press member to impart a desired curvature to said sheet, said second shaping surface being movable slightly with said sheet upon engagement therewith.

2. A method according to claim 1, including supporting said heated sheet in a substantially horizontal plane on conveyor rolls above said first mentioned press member, and moving said shaping surfaces upwardly to engage said sheet and lift said sheet upwardly off said conveyor rolls and press the same against said opposed press member.

3. A method according to claim 2, including moving said second shaping surface slightly laterally along with said glass sheet relative to said first shaping surface.

4. A method according to claim 1, including providing a cover for said second shaping surface, and maintaining said cover in an unwrinkled condition against said second shaping surface.

5. A method according to claim 1, including selectively adjusting the disposition of portions of said second shaping surface relative to said first shaping surface prior to initiating the bending cycle.

6. A method according to claim 1, including a plurality of second shaping surfaces located within the outline of said first shaping surface for imparting the desired reverse bowed curvature to said glass sheet.

7. A method according to claim 1, including supporting said heated sheet in a substantially horizontal plane on conveyor rolls above said first mentioned press member, moving said shaping surfaces upwardly to engage said sheet and lift said sheet upwardly off said conveyor rolls and toward said opposed press member, moving said second shaping surface along with said glass sheet slightly laterally relative to said first shaping surface, providing a cover for said second shaping surface, maintaining said cover in an unwrinkled condition against said second shaping surface, and selectively adjusting the disposition of portions of said second shaping surface relative to said first shaping surface prior to initiating the bending cycle.

8. Apparatus for bending a glass sheet comprising: a frame, a pair of opposed press members mounted on said frame for movement relative thereto toward and away from each other, one of said press members having an outline shaping rail provided with a shaping surface conforming to the marginal outline of the glass sheet to be bent, at least one shaping element mounted within said shaping rail and having an irregular shaping surface thereon for imparting a specially configured shape to an interior portion of said sheet, and means floatingly mounting said shaping element on said press member for free movement relative thereto.

9. Apparatus according to claim 8, including a cover extending across the length and width of the shaping surface of said shaping element when in contact therewith.

10. Apparatus according to claim 9, wherein said cover is double layered and is formed of a resiliently yieldable, nonabrasive, heat resistant material.

11. Apparatus according to claim 9, including means for maintaining said cover in an unwrinkled condition for length and width thereof.

12. Apparatus according to claim 11, wherein said maintaining means includes a clamp resiliently mounted on said one press member for securing one end of said cover and adjustable means secured to the other end of said cover for adjusting the tension of said cover in a longitudinal direction.

13. Apparatus according to claim 12, wherein said maintaining means also includes a pair of spaced guide elements about which the cover is guided and having outer convex curvatures for stretching said cover crosswise thereof.

14. Apparatus for bending a glass sheet comprising: a frame, a pair of opposed press members mounted on said frame for movement relative thereto toward and away from each other, one of said press members having an outline shaping rail provided with a shaping surface conforming to the marginal outline of the glass sheet to be bent, at least one shaping element mounted within said shaping rail and having an irregular shaping surface thereon for imparting a specially configured shape to an interior portion of said sheet, means mounting said shaping element on said press member for floating movement relative thereto, a cover extending across the length and width of the shaping surface of said shaping element when in contact therewith, said mounting means comprising a pair of longitudinally spaced posts attached to the underside of said shaping element and pivotally mounted adjacent their one ends to a fixed supporting structure for lateral movement relative thereto, the other ends of said posts being freely suspended.

15. Apparatus according to claim 14, including means mounted on said one press member adjacent the other ends of said posts for applying tension thereagainst limiting the extent of lateral movement of said posts and thereby said shaping element.

16. Apparatus according to claim 15, wherein said tension applying means includes means selectively adjusting the tension against the opposite sides of said posts.

17. Apparatus according to claim 8, including means for selectively adjusting the disposition of portions of said irregular shaping surface relative to said shaping surface of said shaping rail.

18. Apparatus according to claim 17, wherein said adjusting means comprises a plurality of actuating rods operably connected at their one ends to the underside of said shaping element at spaced points therealong, and means for extending and retracting said actuating rods.

19. Apparatus according to claim 18, wherein said last mentioned means include a pluraltity of gear assemblies operatively connected to said actuating rods, respectively, and manually operable control shafts extending outwardly of said one press member and connected to said gear assemblies, respectively, for extending and retracting said actuating rods.

20. Apparatus according to claim 19, wherein said control shafts include torque transmitting universal joints permitting all of said control shafts to extend outwardly of and along one side only of said one press member.

21. Apparatus according to claim 8, wherein said shaping element comprises a composite pad having a metallic base, an intermediate layer of silicone and an outer layer of resiliently yieldable silicone sponge rubber.

22. Apparatus according to claim 8, including a base member supporting said shaping rail, and means mounting said fixed supporting structure for said shaping element on a base plate detachably secured to said base member.

23. Apparatus according to claim 22, including means for adjusting the spaced relation and the vertical and lateral attitude of said base plate relative to said base member for orienting said shaping element in a desired selective position relative to said shaping rail.

* * * * *